(12) United States Patent
Park et al.

(10) Patent No.: US 7,453,953 B2
(45) Date of Patent: Nov. 18, 2008

(54) SYSTEM AND METHOD FOR ENLARGING AMPLITUDE MINIMA IN A LINEAR MODULATION SIGNAL

(75) Inventors: Young-Seo Park, Sunrise, FL (US); Lavanya Doblatyvenkata, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 601 days.

(21) Appl. No.: 11/142,107

(22) Filed: Jun. 1, 2005

(65) Prior Publication Data

US 2006/0274851 A1    Dec. 7, 2006

(51) Int. Cl.
*H04L 25/09*    (2006.01)
(52) U.S. Cl. .................................... 375/296; 455/114.3
(58) Field of Classification Search ......... 375/295–297; 455/114.2–114.3
See application file for complete search history.

(56) References Cited

U.S. PATENT DOCUMENTS

| | | | |
|---|---|---|---|
| 5,469,127 A | | 11/1995 | Hulick et al. |
| 5,751,705 A | * | 5/1998 | Sato .......................... 370/335 |
| 6,144,694 A | * | 11/2000 | Uta et al. ..................... 375/146 |
| 6,242,975 B1 | * | 6/2001 | Eidson et al. ........... 330/124 R |
| 6,351,500 B2 | | 2/2002 | Kumar |
| 7,065,150 B2 | | 6/2006 | Park |

* cited by examiner

*Primary Examiner*—Khanh C Tran

(57) ABSTRACT

A system and a method to enlarge the minimum signal of a linear modulation signal (115) including multi-carrier modulation, such as Scalable advanced Modulation or Orthogonal Frequency Division Multiplexing, are disclosed. A minimum enlarger (120) exploits a simple amplitude limiter (220) so as not to interfere with an existing peak suppression scheme. The amplitude limiter (220) enlarges local minimum amplitude values to a predetermined minimum amplitude threshold if the local minimum amplitude values are less than the predetermined minimum amplitude threshold. While the amplitude limiter (220) adjusts the local minimum amplitude values in the linear modulation signal (115), the phase of the linear modulation signal (115) is maintained. The conditioned linear modulation signal (125) increases the efficiency of a linear power amplifier (130). The spectral change of the linear modulation signal due to the disclosed scheme is negligible because the adjusted signal power is negligible.

14 Claims, 3 Drawing Sheets

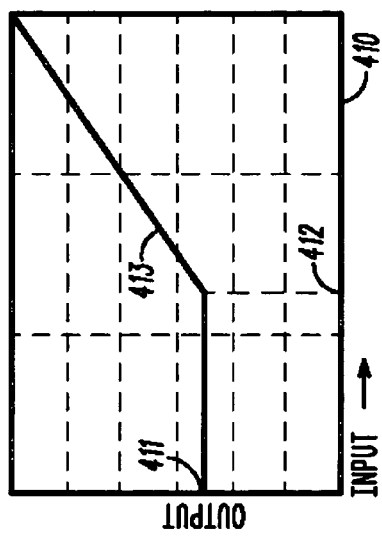
FIG. 4
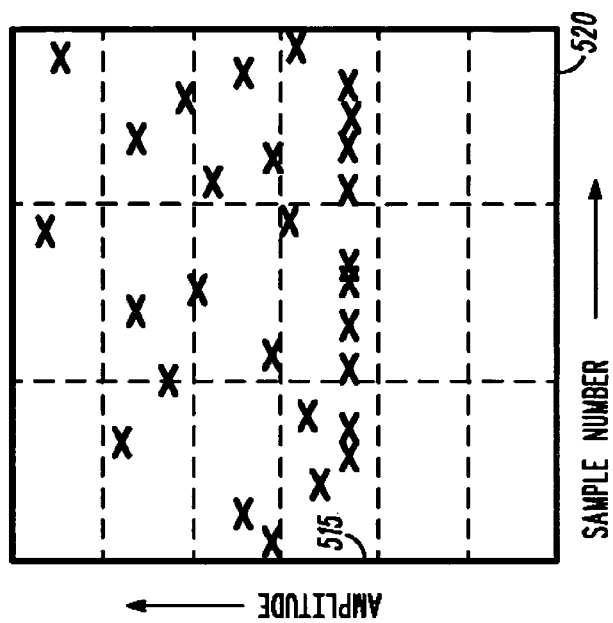
FIG. 5
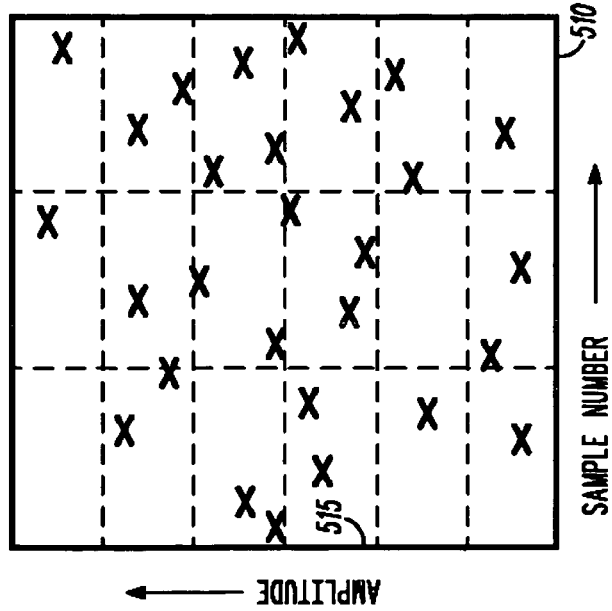

SYSTEM AND METHOD FOR ENLARGING AMPLITUDE MINIMA IN A LINEAR MODULATION SIGNAL

FIELD OF THE INVENTION

The present invention relates generally to the field of communication systems. In particular, the present invention relates to the conditioning of linear modulated signals, such as multi-carrier signals including Scalable Advanced Modulation (SAM) signals or Orthogonal Frequency Division Multiplexing (OFDM) signals, used in digital transmitters.

BACKGROUND OF THE INVENTION

In communication systems, a signal is modulated and amplified for transmission over communication channels. The signal is modulated using a modulator and amplified using a linear power amplifier. Different modulation techniques are developed to convey the signal across the communication channel. Examples of modulation techniques include amplitude modulation, phase modulation, and frequency modulation. Depending upon the modulation technique used, a resultant transmitted signal may have a varying dynamic range and a varying Peak to Average Power Ratio (PAPR). The dynamic range is defined as the ratio between the peak signal power and the minimum signal power. The PAPR is defined as the ratio between peak signal power and the average signal power. The dynamic range and the PAPR of the modulated signal affect the efficiency of the linear power amplifier. Efficiency of the linear power amplifier decreases as the dynamic range, the PAPR, or a combination of both, increases.

In other words, amplitude value of the peak signal and the minimum signal affects the efficiency of the linear power amplifier. Higher amplitude of the peak signal, and lower amplitude of the minimum signal reduce the efficiency of the linear power amplifier. Therefore, in order to increase the efficiency of the linear power amplifier, either the amplitude of the minimum signal may be enlarged, or the amplitude of the peak signal may be suppressed.

There are various methods that use suppression or enlargement of the amplitude of the peak signal or minimum signal to improve the efficiency of the linear power amplifier. A window clipping scheme is one such method that uses suppression of the amplitude of the peak signal of a modulated signal to increase the efficiency of the linear power amplifier. On the other hand, a windowed minimum enlarger increases the amplitude of the minimum signal. The windowed minimum enlarger is applied to signals having minimum amplitude values that are less than a predefined minimum threshold value. The windowed minimum enlarger function scales-up the amplitude of that portion of the signal.

Adjacent Channel Coupled Signal Power (ACCPR) is defined as the ratio of the signal power in the adjacent channel and the signal power in the main channel. In order to maintain a low ACCPR for a multi-carrier signal, both the window clipping and the windowed minimum enlarger have to be applied with a considerable window length. The windowed minimum enlarger is the same with the window clipping but clipping the low peak (or minimum) signal. For example, to maintain a low ACCPR a window size of 19 samples is used in a High Performance Data (HPD) signal. This causes overlap in the samples of window clipping and the windowed minimum enlarger. Further, the amplification factor for minimum enlargement is more than that used for peak suppression. As a result of this overlap, the suppressed peak signals lying in the overlapping region are again increased by the windowed minimum enlarger, which increases the Peak to Average Power Ratio (PAPR) again.

Accordingly, there is a need for an improved apparatus and technique for conditioning a linear modulation signal without interfering with peak suppression schemes.

BRIEF DESCRIPTION OF THE DRAWINGS

The present invention is illustrated by way of example and not limitation in the accompanying figures, in which like references indicate similar elements, and in which:

FIG. 4 illustrates an amplitude limiter function for minimum enlargement, in accordance with various embodiments of the invention;

FIG. 5 illustrates the effect of application of the amplitude limiter function on an Orthogonal Frequency Division Multiplexing (OFDM) signal, in accordance with one of the embodiments of the present invention; and Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Figure 1:
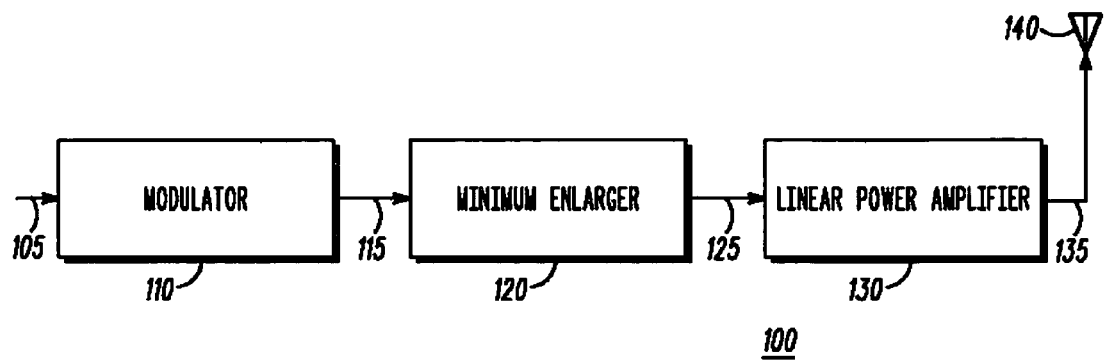
FIG. 1 is a block diagram of a digital transmitter in which various embodiments of the present invention are practiced.

In an embodiment, a digital transmitter includes a modulator and a minimum enlarger. The modulator provides a linear modulation signal, which is characterized by its amplitude and phase. The minimum enlarger receives the linear modulation signal and provides conditioning to the linear modulation signal. The minimum enlarger includes a detector, a comparator, and an amplitude limiter. The detector detects a local minimum amplitude value in the linear modulation signal. The comparator compares the local minimum amplitude value with a predetermined minimum amplitude threshold. The amplitude limiter adjusts the local minimum amplitude value of the linear modulation signal to the predetermined minimum amplitude threshold if the local minimum amplitude value is less than the predetermined minimum amplitude threshold. Furthermore, the amplitude limiter retains the phase of the linear modulation signal while adjusting the linear modulation signal. As a result, the output of the amplitude limiter is an adjusted linear modulation signal.

In another embodiment, a method for enlarging local minimum amplitude value in a linear modulation signal characterized by its amplitude and phase is provided. To enlarge the local minimum amplitude value, first a predetermined minimum amplitude threshold is provided. Then, the local minimum amplitude value in a linear modulation signal is detected. After detecting the local minimum amplitude value, the local minimum amplitude value is compared with the predetermined minimum amplitude threshold. Further, the local minimum amplitude value is adjusted to the predetermined minimum amplitude threshold when the local minimum amplitude value is less than predetermined amplitude threshold. Furthermore, while adjusting the linear modulation signal, the phase of the linear modulation signal is retained.

Before describing in detail a method and system for enlarging local minimum amplitude values in a linear modulation signal, in accordance with the present invention, it should be observed that the present invention resides primarily in combinations of method steps and apparatus components related to a digital transmitter. Accordingly, the apparatus components and method steps have been represented, where appropriate, by conventional symbols in the drawings. These drawings show only the specific details that are pertinent for understanding the present invention, so as not to obscure the disclosure with details that will be apparent to those with ordinary skill in the art and the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Various embodiments of the present invention provide a method and a system for enlarging local minimum amplitude values in a linear modulation signal. In accordance with the present invention, the linear modulations signal's local minimum amplitude values are conditioned by adjusting (or not adjusting) the amplitude values based on predetermined criteria. In an embodiment of the invention, amplitude in a local minimum amplitude value is adjusted by replacing it with a desired amplitude value. In another embodiment, the amplitude of the local minimum amplitude value is adjusted by scaling it up to the desired amplitude value.

FIG. 1 is a block diagram of a digital transmitter 100 in which various embodiments of the present invention are practiced. The digital transmitter 100 includes a modulator 110, a minimum enlarger 120, a linear power amplifier 130, and an antenna 140. The modulator 110 provides a linear modulation to a signal 105. The output of the modulator 110 is a linear modulation signal 115. The linear modulation signal 115 is forwarded to the minimum enlarger 120. The minimum enlarger 120 conditions the linear modulation signal 115 to produce a conditioned signal 125. The linear modulation signal 115 is conditioned by adjusting the local minimum amplitude values in the linear modulation signal 115. Further, the conditioned signal 125 has the local minimum amplitude value that is greater than, or equal to a predetermined minimum amplitude threshold. As a result, conditioned signal 125 has a reduced dynamic range. The dynamic range is defined as, but is not limited to, the ratio between the peak signal power and the minimum signal power. The conditioned signal 125 with the reduced dynamic range increases the efficiency of the linear power amplifier 130.

The conditioned signal 125 is then passed to the linear power amplifier 130. The linear power amplifier 130 amplifies the conditioned signal 125 to produce an amplified signal 135. The amplified signal 135 then is forwarded to the antenna 140 that radiates the amplified signal 135 to a remote receiver (not shown in the figure).

In various embodiments of the invention, the linear modulation signal 115 may be a multi-carrier signal such as an Orthogonal Frequency Division Multiplexing (OFDM) signal, or a Scalable Advanced Modulation (SAM) signal.

The linear power amplifier 130 has a predefined operating range, such as an operating range of −30 decibel (dB) to 6 dB, in which the amplified signal 135 depends linearly upon the conditioned signal 125. For example, if the conditioned signal 125 is increased by a factor 1000 then the amplified signal 135 is also increased by the same factor.

Figure 2:
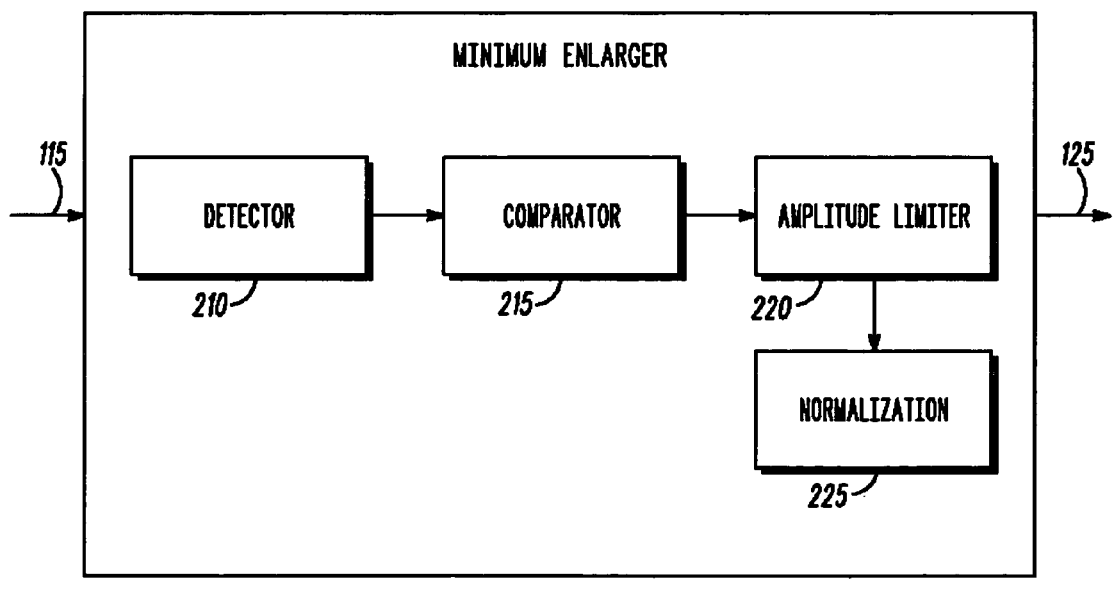
FIG. 2 is a block diagram of the sub-components of a minimum enlarger, in accordance with various embodiments of the present invention.

FIG. 2 is a block diagram of the sub-components of the minimum enlarger 120, in accordance with various embodiments of the present invention. The minimum enlarger 120 comprises a detector 210, a comparator 215, an amplitude limiter 220, and normalization means 225. The detector 210 identifies the local minimum amplitude values in the linear modulation signal 115. The comparator 215 compares the local minimum amplitude values of the linear modulation signal 115 with a predetermined minimum amplitude threshold. The amplitude limiter 220 adjusts the local minimum amplitude value in the linear modulation signal 115 to the predetermined minimum amplitude threshold. The amplitude limiter 220 adjusts the local minimum amplitude value when it is less than the predetermined minimum amplitude threshold. While the amplitude limiter 220 adjusts the local minimum amplitude value, it substantially maintains phase of the linear modulation signal 115. In one embodiment, the amplitude limiter 220 replaces a local minimum amplitude value with the predetermined minimum amplitude threshold. In another embodiment, the amplitude limiter 220 scales up the local minimum amplitude value to the predetermined minimum amplitude threshold. The local minimum amplitude value of the linear modulation signal may be scaled by multiplying the local minimum amplitude by a scaling factor. The scaling factor may be found by dividing the predetermined minimum amplitude threshold by the local minimum amplitude value.

In various embodiments of the invention, the means for normalizing 225 normalizes the adjusted linear modulation signal to maintain an equivalent total signal power at the input and the output of the amplitude limiter 220. The adjusted linear modulation signal is normalized by dividing it by the root mean square of all the adjusted linear modulation signals. The normalization maintains the average power (after the adjustment of the linear modulation signal 115) within a predefined limit. However, the means for normalizing 225 does not act upon the adjusted linear modulation signal when the change in total signal power at the input and the output of the amplitude limiter 220 is negligible, which is most of the cases. Therefore, normalization is not generally required.

In accordance with various embodiments of the invention, the output of the minimum enlarger 120 is the conditioned signal 125. The conditioned signal 125 has its local minimum amplitude value adjusted with respect to the minimum amplitude that the linear power amplifier 130 can amplify. The conditioned signal 125 has a reduced dynamic range.

Figure 3:
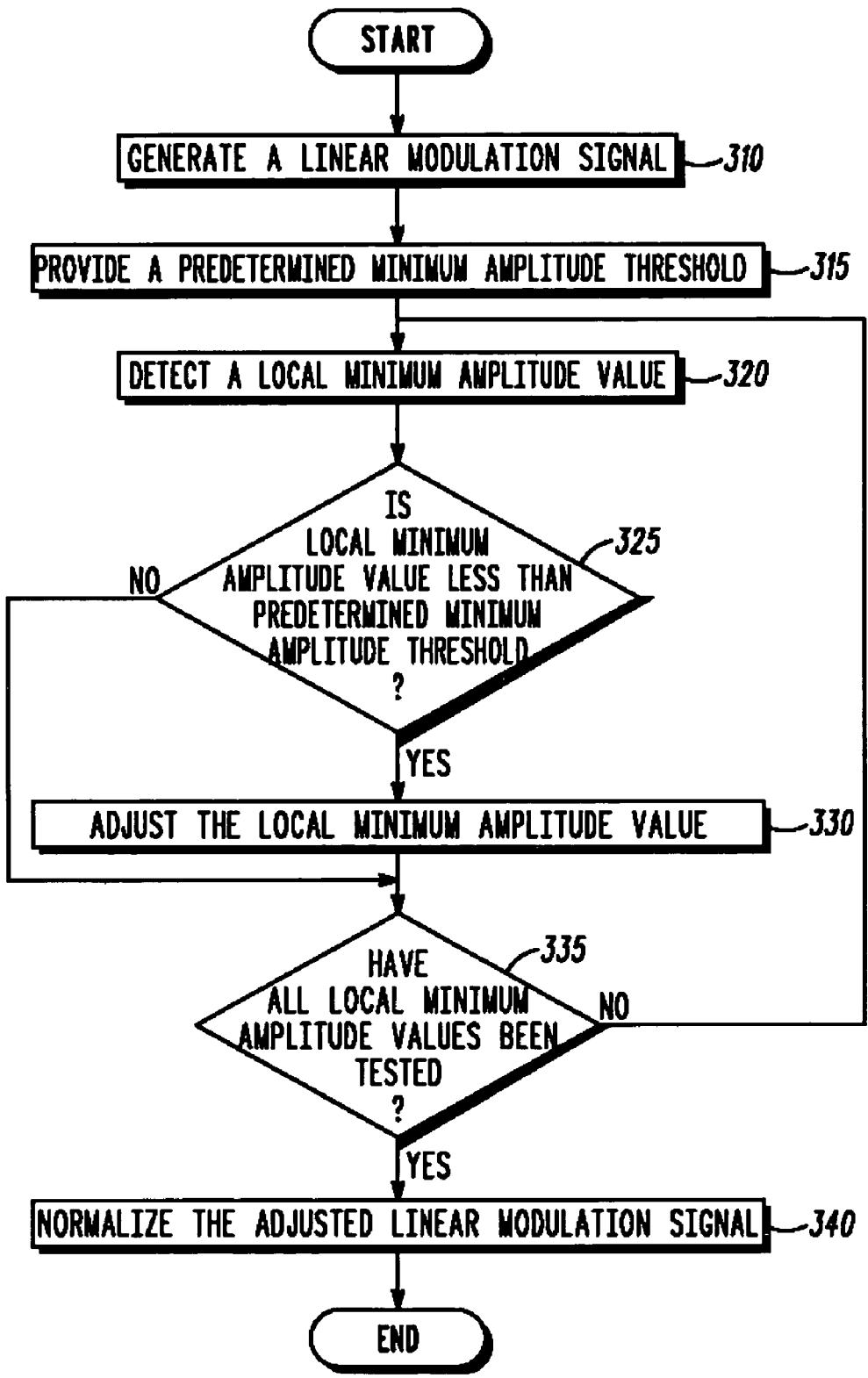
FIG. 3 is a flowchart for conditioning a linear modulation signal, in accordance with various embodiments of the present invention.

FIG. 3 shows a flowchart for conditioning the linear modulation signal 115, in accordance with various embodiments of the present invention. At step 310, the modulator 110 generates the linear modulation signal 115. At step 315, a predetermined minimum amplitude threshold is provided by the minimum enlarger 120. In an embodiment of the invention, the predetermined minimum amplitude threshold is set in accordance with a predefined operating range of the linear power amplifier 130. At step 320, the detector 210 detects a local minimum amplitude value in the linear modulation signal 115. At step 325, the comparator 215 compares the local minimum amplitude value with the predetermined minimum amplitude threshold. If the local minimum amplitude value is less than the predetermined minimum amplitude threshold then step 330 is performed. At step 330, the amplitude limiter 220 adjusts the local minimum amplitude value to the predetermined minimum amplitude threshold. While the amplitude limiter 220 adjusts the local minimum amplitude value, it retains the phase of the linear modulation signal 115. After step 330 has been performed, the method goes to step 335.

When the local minimum amplitude value is greater than or is equal to the predetermined minimum amplitude threshold then step 330 is not performed, and the method goes directly to step 335. At step 335, a check of whether all the local minimum amplitude values have been tested for minimum enlargement is performed. When all the local minimum amplitude values have been tested for minimum enlargement, step 340 is performed. At step 340, the adjusted linear modulation signal is normalized. The adjusted linear modulation signal is normalized by dividing the adjusted linear modulation signal by the root mean square of the adjusted linear modulation signals. The adjusted linear modulation signal is normalized to maintain total signal power at the input and output of the amplitude limiter 220. However, the flow chart terminates, (i.e., step 340 may not be performed) if the total signal power at the input and output of the amplitude limiter 220 is maintained. At step 335, if the linear modulation signal 115 has not been tested for minimum enlargement then steps 320 to 330 are repeated.

FIG. 4 illustrates an amplitude limiter function, in accordance with various embodiments of the present invention. The amplitude limiter function adjusts the local minimum amplitude value to the minimum threshold amplitude value by replacing the undesired signal amplitude with the desired signal amplitude, while retaining the phase of the signal. The amplitude limiter function 410 prevents the linear modulation signal 115 to fall below a predetermined minimum value 411. The amplitude limiter function 410 replaces its output by the predetermined minimum value 411 when the input falls below a value, i.e., a value 412. As a result, the output remains constant at the predetermined minimum value 411 even when the input falls below the value 412. Further, the output values corresponding to input greater than or equal to the value 412 are replaced by a first linear function 413.

FIG. 5 illustrates the effect of application of the amplitude limiter function 410 on an Orthogonal Frequency Division Multiplexing (OFDM) signal, in accordance with an embodiment of the present invention. A chart 510 represents the local minimum amplitude values in a channel of the OFDM signal before the application of the amplitude limiter function 410. Cross-marks (in the chart 510) represent the local minimum amplitude values in the channel of the OFDM signal. A chart 520 represents of the local minimum amplitude values in the channel of the OFDM signal after the application of the amplitude limiter function 410. The chart 510 shows that certain local minimum amplitude values in the channel of the OFDM signal are less than a predetermined minimum amplitude threshold 515. In the chart 520, the amplitude limiter function 410 replaces these local minimum amplitude values by the predetermined minimum amplitude threshold 515. The amplitude limiter function 410, however, maintains the phase of the replaced local minimum amplitude values. For example, if a(m) is a local minimum amplitude value in a channel of OFDM signal, δ is the predetermined minimum amplitude threshold, and $a_1(m)$ is the replaced amplitude by the amplitude limiter function 410 then:

$a_1(m) = a(m)$, when $|a(m)| \geq \delta$, $a_1(m) = \delta \angle a(m)$, when $|a(m)| < \delta$ In accordance with various embodiments of the invention, the amplitude limiter 220 adjusts the local minimum amplitude value by scaling the local minimum amplitude value to the predetermined minimum amplitude threshold. The local minimum amplitude value of the linear modulation signal may be scaled by multiplying the local minimum amplitude by a scaling factor. The scaling factor may be found by dividing the predetermined minimum amplitude threshold by the local minimum amplitude value.

In an embodiment of the invention, an electronic device for enlarging a local minimum amplitude value in a linear modulation signal, which is characterized by amplitude and phase, includes a means for comparing and a means for adjusting. The means for comparing compares a local minimum amplitude value in a linear modulation signal with a predetermined minimum amplitude threshold. A result of the comparison is passed to the adjusting means where the local minimum amplitude value in the linear modulation signal is adjusted to the predetermined minimum amplitude threshold. The means for adjusting adjusts the local minimum amplitude value in the linear modulation signal, when the local minimum amplitude value is less than the predetermined minimum amplitude threshold. Further, the means for adjusting retains the phase of the linear modulation signal while adjusting the local minimum amplitude value.

Various embodiments of the present invention provide the conditioned signal 125 to increase the efficiency of the linear power amplifier 130. This is achieved by obtaining the conditioned signal 125 with local minimum amplitude values that is more than or equal to the predetermined minimum amplitude threshold. As a result, the conditioned signal 125 has reduced dynamic range. For example, a resultant −29.80 dB PAPR can be achieved (when the target is −30 dB) with 10,000 slots simulation with 64 Quadrature Amplitude Modulation (QAM). The reduced dynamic range increases the efficiency of the linear power amplifier 130.

Various embodiments of the present invention increase the local minimum amplitude value without changing other characteristics of the linear modulation signal. For example, while replacing the local minimum amplitude value in the linear modulation signal with the predetermined minimum amplitude threshold, the phase of the linear modulation signal is retained.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A digital transmitter, comprising:
   a modulator for providing a linear modulation signal characterized by amplitude and phase; and
   a minimum enlarger for receiving the linear modulation signal, wherein the minimum enlarger comprises:

a detector for detecting a local minimum amplitude value in the linear modulation signal;

a comparator for comparing the local minimum amplitude value with a predetermined minimum amplitude threshold;

an amplitude limiter for adjusting the local minimum amplitude value to the predetermined minimum amplitude threshold while maintaining the phase of the linear modulation signal, when the local minimum amplitude value is less than the predetermined minimum amplitude threshold, thereby providing an adjusted linear modulation signal; and a means for normalizing that divides the adjusted linear modulation signal by a root mean square of the adjusted linear modulation signals to maintain an equivalent total signal power at an input and an output of the amplitude limiter.

2. The digital transmitter of claim 1, wherein the amplitude limiter adjusts the local minimum amplitude value by scaling the local minimum amplitude value to the predetermined minimum amplitude threshold.

3. The digital transmitter of claim 1, wherein the amplitude limiter adjusts the local minimum amplitude value by replacing the local minimum amplitude value with the predetermined minimum amplitude threshold.

4. The digital transmitter of claim 3, wherein the amplitude limiter replaces the local minimum amplitude value by applying an amplitude limiter function.

5. The digital transmitter of claim 1 further comprising a linear power amplifier requiring a limited dynamic range that is provided by the minimum enlarger.

6. The digital transmitter of claim 1, wherein the linear modulation signal includes a multi-carrier modulation signal.

7. The digital transmitter of claim 6, wherein the multi-carrier modulation signal includes a Scalable Advanced Modulation (SAM) signal.

8. The digital transmitter of claim 6, wherein the multi-carrier modulation signal includes an Orthogonal Frequency Division Multiplexing (OFDM) signal.

9. A method for enlarging a local minimum amplitude value in a linear modulation signal characterized by amplitude and phase, the method comprising:

providing a predetermined minimum amplitude threshold for the linear modulation signal;

detecting a local minimum amplitude value in the linear modulation signal;

comparing the local minimum amplitude value with the predetermined minimum amplitude threshold;

adjusting the local minimum amplitude value to the predetermined minimum amplitude threshold when the local minimum amplitude value is less than the predetermined minimum amplitude threshold while maintaining the phase of the linear modulation signal; and normalizing the linear modulation signal by dividing the adjusted linear modulation signal by a root mean square of the adjusted linear modulation signals to maintain an equivalent total signal power at an input and an output of an amplitude limiter, the amplitude limiter adjusting the local minimum amplitude value of the linear modulation signal.

10. The method of claim 9, wherein the step of adjusting comprises the step of scaling the local minimum amplitude value to the predetermined minimum amplitude threshold.

11. The method of claim 9, wherein the step of adjusting comprises the step of replacing the local minimum amplitude value with the predetermined minimum amplitude threshold.

12. The method of claim 11, wherein the step of replacing the local minimum amplitude value comprises applying an amplitude limiter function to the linear modulation signal.

13. The method of claim 9, wherein the linear modulation signal includes a multi-carrier signal.

14. The method of claim 13, wherein the multi-carrier signal includes one of a Scalable Amplitude Modulation (SAM) signal and an Orthogonal Frequency Division Multiplexing (OFDM) signal.

* * * * *